US012770370B2

(12) United States Patent
Wang et al.

(10) Patent No.: US 12,770,370 B2
(45) Date of Patent: Oct. 20, 2026

(54) SYSTEM AND METHOD WITH ADAPTIVE RESOLUTION FOR SEMANTIC OCCUPANCY

(71) Applicant: Robert Bosch GmbH, Stuttgart (DE)

(72) Inventors: Ruoyu Wang, Sunnyvale, CA (US); Cheng Zhao, Milpitas, CA (US); Yuliang Guo, Redwood City, CA (US); Xinyu Huang, San Jose, CA (US); Liu Ren, Saratoga, CA (US)

(73) Assignee: Robert Bosch GmbH, Stuttgart (DE)

(*) Notice: Subject to any disclaimer, the term of this patent is extended or adjusted under 35 U.S.C. 154(b) by 242 days.

(21) Appl. No.: 18/650,863

(22) Filed: Apr. 30, 2024

(65) Prior Publication Data

US 2025/0336186 A1 Oct. 30, 2025

(51) Int. Cl.

| | |
|---|---|
| ***G06V 10/77*** | (2022.01) |
| ***G06V 20/56*** | (2022.01) |
| ***G06V 20/64*** | (2022.01) |
| *G06V 10/82* | (2022.01) |
| *G06V 20/70* | (2022.01) |

(52) U.S. Cl.

CPC .......... *G06V 10/7715* (2022.01); *G06V 20/64* (2022.01); *G06V 10/82* (2022.01); *G06V 20/56* (2022.01); *G06V 20/70* (2022.01)

(58) Field of Classification Search

None

See application file for complete search history.

(56) References Cited

FOREIGN PATENT DOCUMENTS

CN 112037138 A * 12/2020 ............... G06N 7/01

OTHER PUBLICATIONS

Xiaokang Chen et al; Real-Time Semantic Scene Completion Via Feature Aggregation and Conditioned Prediction, Peking University, ICIP 2020, pp. 2830-2834. (Year: 2020).*

Yingjie Cai et al; Semantic Scene Completion via Integrating Instances and Scene in-the-Loop, 2021 IEEE/CVF Conference on Computer Vision and Pattern Recognition, pp. 324-333. (Year: 2021).*

(Continued)

*Primary Examiner* — David Ometz

(74) *Attorney, Agent, or Firm* — Kathy Takeguchi; Maginot, Moore & Beck LLP

(57) ABSTRACT

A computer-implemented method and system include a first machine learning system, which generates feature maps using a set of digital images. A second machine learning system uses the feature maps to generate object boundary data of a set of objects, which are displayed in the set of digital images. Three-dimensional (3D) feature volume data are generated using the feature maps. A coarse occupancy map is generated using the 3D feature volume data. The coarse occupancy map has a first resolution. The coarse occupancy map includes an environment and the set of objects. Surface data is generated using the object boundary data and the 3D feature volume data. The surface data has a second resolution. A hybrid occupancy map is generated by combining the coarse occupancy map and the surface data. The hybrid occupancy map displays the environment with the first resolution and the set of objects with the second resolution.

20 Claims, 5 Drawing Sheets

(56) References Cited

OTHER PUBLICATIONS

R. Fu, H. Wu, M. Hao and Y. Miao, "Semantic Scene Completion through Multi-Level Feature Fusion," 2022 IEEE/RSJ International Conference on Intelligent Robots and Systems (IROS), Kyoto, Japan, 2022, pp. 8399-8406. (Year: 2022).*
Pingping Zhang et al; Cascaded Context Pyramid for Full-Resolution 3D Semantic Scene Completion, arXiv:1908.00382, Aug. 2019 , pp. 7800-7809. (Year: 2019).*
Wang et al., "OpenOccupancy: A Large Scale Benchmark for Surrounding Semantic Occupancy Perception," ICCV paper, Open Access version provided by the Computer Vision Foundation, pp. 17850-17859.
Wei et al., "SurroundOcc: Multi-Camera 3D Occupancy Prediction for Autonomous Driving," ICCV paper, Open Access version provided by the Computer Vision Foundation, pp. 21729-21740.
Zhang et al., "OccFormer: Dual-path Transformer for Vision-based 3D Semantic Occupancy Prediction," ICCV paper, Open Access version provided by the Computer Vision Foundation, pp. 9433-9443.

* cited by examiner

SYSTEM AND METHOD WITH ADAPTIVE RESOLUTION FOR SEMANTIC OCCUPANCY

TECHNICAL FIELD

This disclosure relates generally to digital image processing and computer vision, and more particularly to three-dimensional semantic occupancy maps.

BACKGROUND

In general, three-dimensional (3D) semantic occupancy prediction is an advanced technique that aims to understand and represent 3D environments in a semantically meaningful way. More specifically, 3D semantic occupancy prediction is a task that involves identifying whether or not a space is occupied and also involves understanding what objects or materials are in the occupied spaces. However, 3D semantic occupancy is challenging due to the high computational complexity and memory requirements associated with processing such large-scale 3D data.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method includes receiving a set of digital images. The set of digital images display at least an environment and a set of objects. The method includes generating, via a first machine learning system, feature maps using the set of digital images. The method includes generating, via a second machine learning system, object boundary data of the set of objects using the feature maps. The method includes generating three-dimensional (3D) feature volume data using the feature maps. The method includes generating a coarse occupancy map using the 3D feature volume data. The coarse occupancy map has a first resolution of a first range. The coarse occupancy map includes the environment and the set of objects. The method includes generating surface data of the set of objects using the object boundary data and the 3D feature volume data. The surface data has a second resolution of a second range. The second range is different from the first range. The method includes generating a hybrid occupancy map by combining the coarse occupancy map and the surface data. The hybrid occupancy map displays the environment with the first resolution and the set of objects with the second resolution.

According to at least one aspect, a system includes one or more processors and one or more computer memory. The one or more computer memory is in data communication with the one or more processors. The one or more computer memory includes computer readable data stored thereon. The computer readable data include instructions that, when executed by one or more processors, causes the one or more processors to perform a method. The method includes receiving a set of digital images. The set of digital images display at least an environment and a set of objects. The method includes generating, via a first machine learning system, feature maps using the set of digital images. The method includes generating, via a second machine learning system, object boundary data of the set of objects using the feature maps. The method includes generating three-dimensional (3D) feature volume data using the feature maps. The method includes generating a coarse occupancy map using the 3D feature volume data. The coarse occupancy map has a first resolution of a first range. The coarse occupancy map includes the environment and the set of objects. The method includes generating surface data of the set of objects using the object boundary data and the 3D feature volume data. The surface data has a second resolution of a second range. The second range is different from the first range. The method includes generating a hybrid occupancy map by combining the coarse occupancy map and the surface data. The hybrid occupancy map displays the environment with the first resolution and the set of objects with the second resolution.

According to at least one aspect, one or more non-transitory computer readable mediums having computer readable data stored thereon. The computer readable data includes instructions that, when executed by one or more processors, cause the one or more processors to perform a method. The method includes receiving a set of digital images. The set of digital images display at least an environment and a set of objects. The method includes generating, via a first machine learning system, feature maps using the set of digital images. The method includes generating, via a second machine learning system, object boundary data of the set of objects using the feature maps. The method includes generating three-dimensional (3D) feature volume data using the feature maps. The method includes generating a coarse occupancy map using the 3D feature volume data. The coarse occupancy map has a first resolution of a first range. The coarse occupancy map includes the environment and the set of objects. The method includes generating surface data of the set of objects using the object boundary data and the 3D feature volume data. The surface data has a second resolution of a second range. The second range is different from the first range. The method includes generating a hybrid occupancy map by combining the coarse occupancy map and the surface data. The hybrid occupancy map displays the environment with the first resolution and the set of objects with the second resolution.

These and other features, aspects, and advantages of the present invention are discussed in the following detailed description in accordance with the accompanying drawings throughout which like characters represent similar or like parts. Furthermore, the drawings are not necessarily to scale, as some features could be exaggerated or minimized to show details of particular components.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
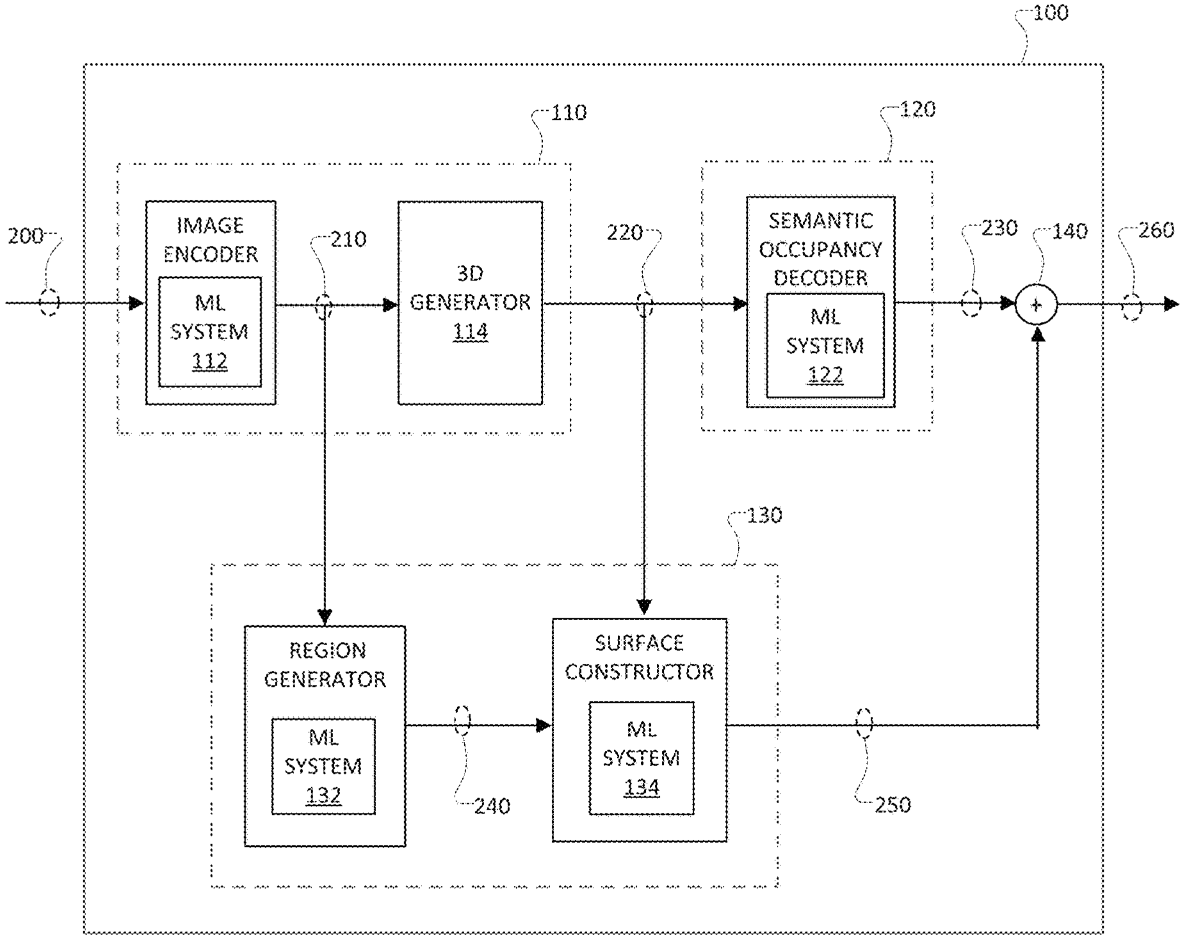
FIG. 1 is a flow diagram of an example of a process of generating a hybrid occupancy map according to an example embodiment of this disclosure.
Figure 2A:
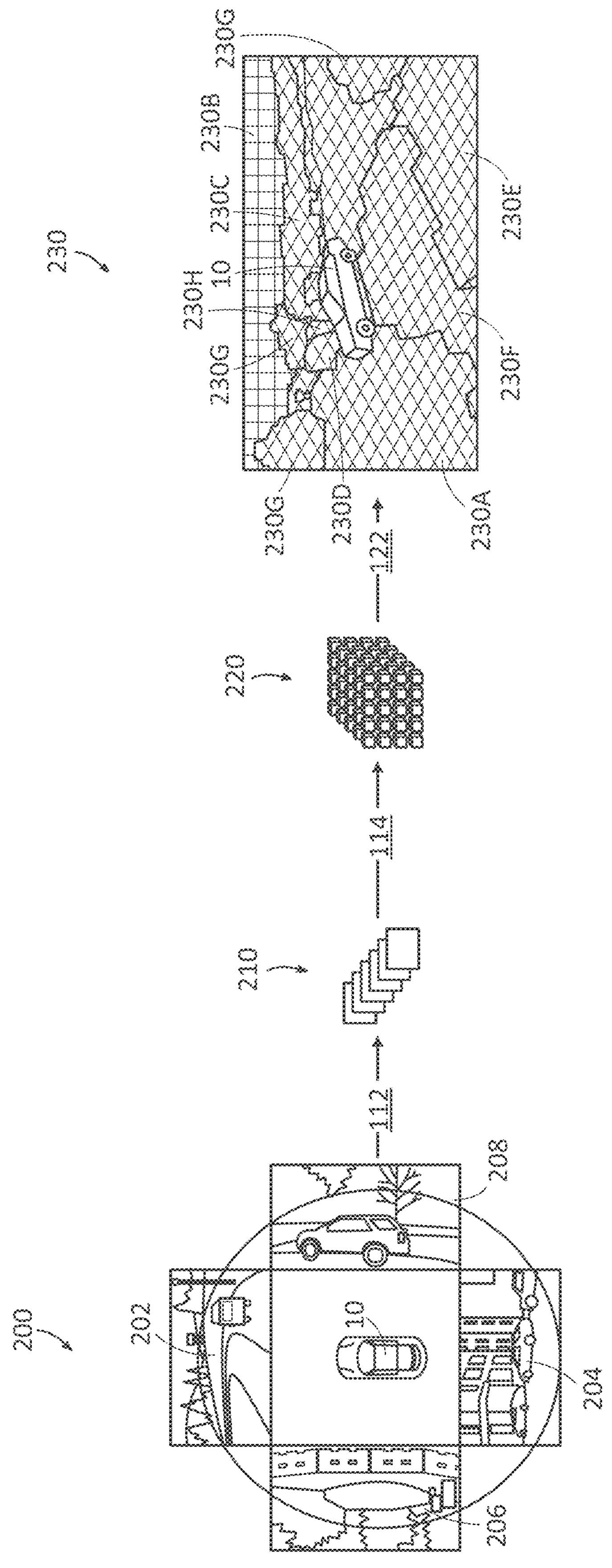
FIG. 2A is a flow diagram of non-limiting data examples involving a lower-resolution portion of the process of FIG. 1 according to an example embodiment of this disclosure.
Figure 2B:
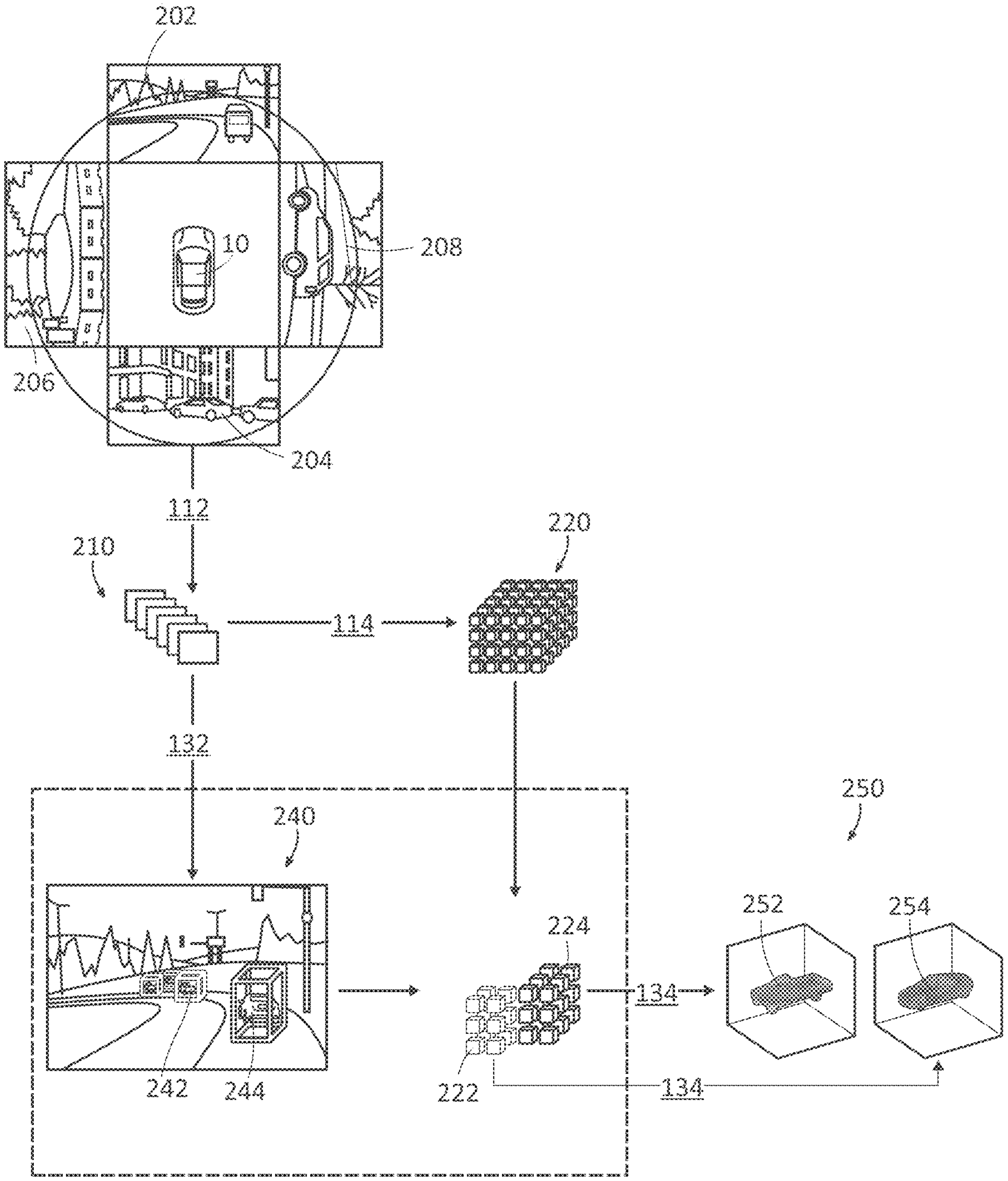
FIG. 2B is a flow diagram of non-limiting data examples involving a higher-resolution portion of the process of FIG. 1 according to an example embodiment of this disclosure.
Figure 2C:
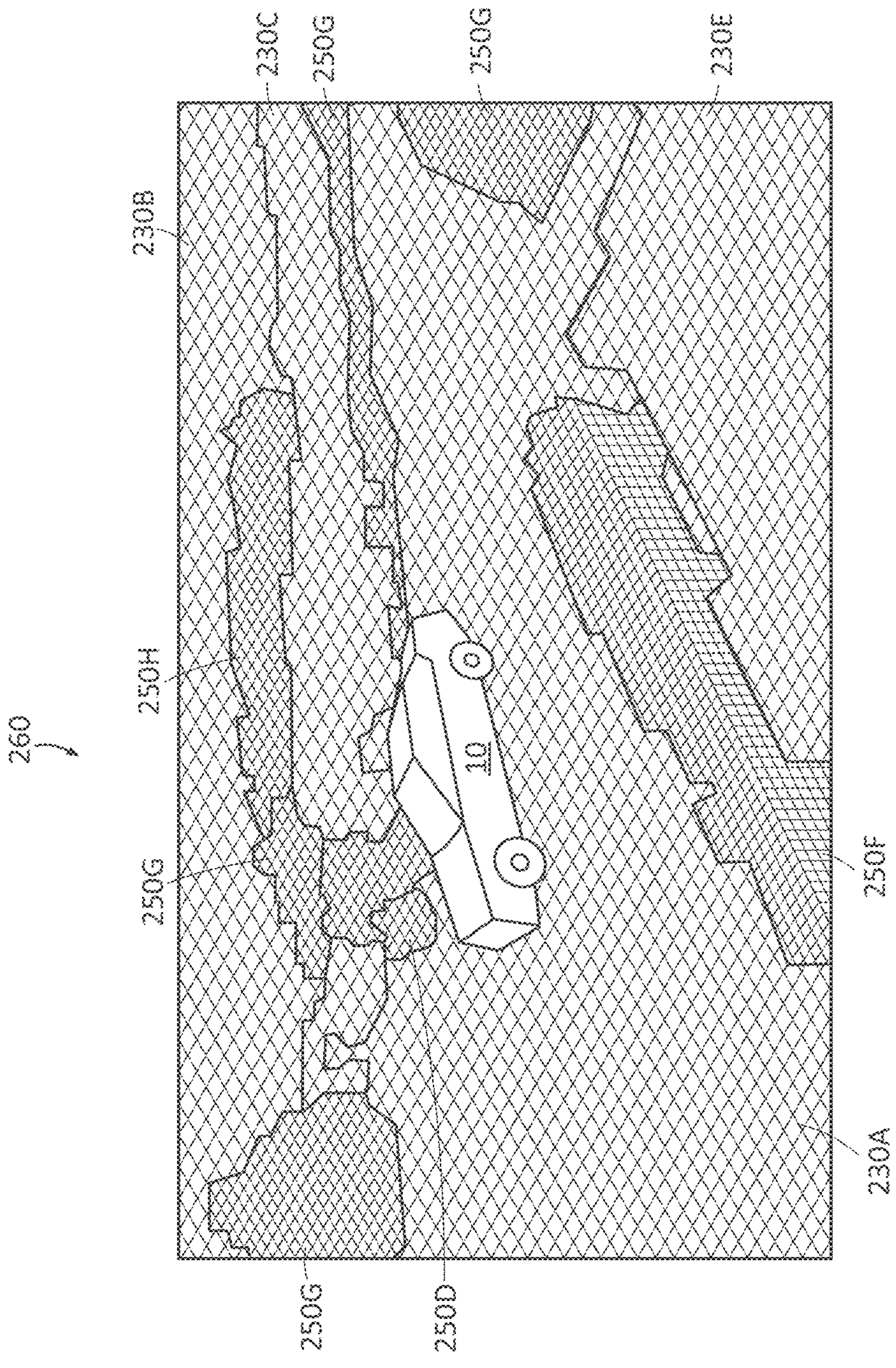
FIG. 2C is a non-limiting example of a hybrid occupancy map according to an example embodiment of this disclosure.

FIG. 1, FIG. 2A, FIG. 2B, and FIG. 2C illustrate various aspects of an example of a process of an adaptive resolution generator 100 according to an example embodiment. More specifically, in the example shown in FIG. 1, the adaptive resolution generator 100 includes an image processing module 110, a lower-resolution module 120, and a higher-resolution module 130. These modules are provided for the convenience of discussing aspects of the adaptive resolution generator 100. In this regard, there may be more modules or less modules than that shown in FIG. 1 provided that they are configured to perform same functionalities as described herein. Also, FIG. 2A illustrates non-limiting data examples to show various aspects relating to the generation of at least one coarse occupancy map 230 via the image processing module 110 and the lower-resolution module 120. Meanwhile, FIG. 2B illustrates non-limiting data examples to show various aspects relating to the generation of at least fine surface data 250 via the image processing module 110 and the higher-resolution module 130. Also, FIG. 2C illustrates a non-limiting example of a hybrid occupancy map 260, which is generated by the adaptive resolution generator 100 upon combining the output (e.g., coarse occupancy map 230) of the lower-resolution module 120 and the output (e.g., high-resolution surface data 250) of the higher-resolution module 130.

As an overview, the adaptive resolution generator 100 is configured to generate one or more hybrid occupancy maps 260 for computer vision. The adaptive resolution generator 100 is configured to adjust a level of detail of at least one proposed region (e.g., at least one selected object) of a space or environment of interest. For example, the adaptive resolution generator 100 is advantageous in enhancing detail and improving accuracy in particular regions (e.g., particular objects in an environment or scene), which are selected to be most relevant. The adaptive resolution generator 100 ensures that one or more computational resources (e.g., GPU processing) are used effectively for those particular regions. In addition, the adaptive resolution generator 100 reduces computational requirements (e.g., GPU processing) in the other non-relevant regions for quick processing. The adaptive resolution generator 100 thus ensures efficient and effective use of computer resources (e.g., processors, memory, etc.) while generating 3D adaptive-resolution semantic occupancy maps (i.e., hybrid occupancy maps 260) for real-time applications. The adaptive resolution generator 100 is advantageous in various fields, which require rapid and accurate interpretation of complex environments (e.g., navigation, at least partially autonomous driving, augmented reality, etc.).

In addition to the hybrid occupancy map 260, the adaptive resolution generator 100 is configured to provide and/or output other relevant data for downstream usage. The adaptive resolution generator 100 is configured to provide multi-modal prediction. In response to receiving a set of digital images, the adaptive resolution generator 100 is configured to generate at least (i) object boundary data 240 (e.g., bounding boxes, etc.) associated with detected objects, (ii) object point clouds for the detected objects, and (iii) ego-centric occupancy maps (e.g., hybrid occupancy map 260 and coarse occupancy map 230) that include the detected objects. The adaptive resolution generator 100 is configured to be selective with respect to supplying greater detail and higher resolution in selected regions in which precision matters most. The generated object point clouds are not limited by grid resolution and may be readily extended to multi-resolution grid maps and object surface construction/reconstruction. Furthermore, these multi-modal outputs have been shown to benefit object detection and occupancy prediction tasks. The adaptive resolution generator 100 provides an advancement in 3D scene understanding while also providing a balanced blueprint for enhanced accuracy and diverse outputs in various applications (e.g., self-driving applications, autonomous driving applications, navigation applications, robotic applications, augmented reality applications, etc.) relating to computer vision.

As shown in at least FIG. 1, the adaptive resolution generator 100 includes obtaining or receiving a set of digital images 200. The set of digital images 200 includes one or more digital images. A digital image may be a two-dimensional (2D) digital image. For example, in FIG. 2A and FIG. 2B, the adaptive resolution generator 100 includes obtaining or receiving a set of surrounding-view images as the set of digital images 200. The surrounding-view images provide various views of the environment around or substantially around an ego vehicle 10. More specifically, in FIG. 2A and FIG. 2B, for instance, the set of digital images 200 include (i) at least one digital image 202 that displays a part of the environment at or around a front side of the ego vehicle 10, (ii) at least one digital image 204 that displays a part of the environment at or around a rear side of the ego vehicle 10, (iii) at least one digital image 206 that displays a part of the environment at or around a left side of the vehicle, and (iv) at least one digital image 208 that displays a part of the environment at or around a right side of the vehicle such that a surrounding view of the ego vehicle 10 is provided by this set of digital images. As another example (not shown), the set of digital images 200 comprises an image sequence with temporal information that includes two or more digital images.

The set of digital images 200 are provided as input to the image processing module 110 via an image encoder. The image encoder is configured to receive and encode the set of digital images 200. In an example embodiment, the image encoder comprises a machine learning (ML) system 112. In FIG. 1, the machine learning system 112 includes at least a convolutional neural network (CNN), or at least one machine learning model configured to generate one or more feature maps 210 using one or more digital images. More specifically, the machine learning system 112 is configured to extract a number of essential features from the set of digital images 200 using a series of convolutional layers, activation functions, and pooling layers. In this regard, the machine learning system 112 is configured to transform raw pixel data from each digital image into a more compact and expressive feature representation, thereby capturing the essential visual cues and patterns that are instrumental for subsequent stages of adaptive resolution generator 100. That is, the machine learning system 112 is configured to generate one or more feature maps 210 using the set of digital images.

In addition, as shown in FIG. 1, the image processing module 110 includes a 3D generator 114 to generate 3D feature volume data 220 (e.g., voxel data) using the feature maps 210. The 3D generator 114 may comprise hardware, software, or a combination thereof. In FIG. 1, for example, the 3D generator comprises software technology (e.g., computer readable data including instructions) that is executed by the one or more processors of the processing system 302 to generate corresponding 3D feature volume data 220 using the feature maps 210. The 3D generator 114 is configured to perform a pivotal process of converting 2D feature maps 210 into 3D feature volume data 220 that is intricately linked with a camera's intrinsic and extrinsic parameters. Regarding this 2D to 3D feature projection performed by the 3D generator 114, the parameters play a critical role. The intrinsic parameters comprise and/or relate to the internal characteristics (e.g., focal length, optical center, etc.) of a camera. The intrinsic parameters influence how the features, extracted from the 2D images, are transformed. Concurrently, the extrinsic parameters comprise and/or relate to describing a camera's position and orientation in space. The extrinsic parameters are essential in situating the features accurately within the 3D coordinate system.

The synergy of these intrinsic parameters and extrinsic parameters ensure that the projected 3D features accurately correspond to the real-world spatial arrangements and dimensions. The 3D generator 114 may include a bird's eye view (BEV) encoder, which receives the feature maps 210 and which generates BEV features as feature volume data that is 2D BEV. The 3D generator 114 is configured to generate a result or outcome, which includes finely detailed 3D feature volume data 220 in space that encapsulates the enriched information harvested from the set of digital images 200 (e.g., one or more 2D images). This 3D feature volume data 220 is a spatial representation that is also imbued with semantic nuances, thereby laying a robust foundation for 3D occupancy prediction via the machine learning system 122 ("ML system 122"). The 3D generator 114 translates every nuance of one or more 2D images (or the set of digital images 200 such as the set of surrounding-view images) into the 3D space with high fidelity, thereby ensuring that the downstream occupancy maps (e.g., hybrid occupancy map 260) are both spatially and semantically accurate to serve as reliable substrates for various real-time applications.

The lower-resolution module 120 includes generating a coarse occupancy map 230 using the 3D feature volume data 220. The lower-resolution module 120 includes a machine learning system 122. The machine learning system 122 includes at least one machine learning model that is configured to receive the 3D feature volume data 220 from the 3D generator 114 and generate the low-resolution occupancy map (i.e., the coarse occupancy map 230) using the 3D feature volume data 220. The machine learning system 122 is configured to perform 3D semantic occupancy decoding. In this regard, the lower-resolution module 120 is configured to predict the occupancy and semantic labels of the 3D space using the 3D feature volume data 220. More specifically, as an example, the machine learning system 122 includes at least a CNN. The CNN includes neural network layers. The neural network layers analyze the 3D features to determine which spaces are occupied and what types of objects occupy those occupied spaces. This information (e.g., occupied/unoccupied spaces and object types in the occupied spaces) is used to generate a coarse occupancy map 230. The coarse occupancy map 230 is a comprehensive 3D semantic occupancy map, where each point in the space is assigned a probability of being occupied, along with a semantic label that categorizes the occupying object or material. The coarse occupancy map 230 has a first resolution of a first range. For example, each element of the coarse occupancy map 230 is displayed with a same lower resolution, which is within the first range.

Referring to FIG. 2A, as a non-limiting example, the coarse occupancy map 230 provides a 3D display of an environment with occupied voxels having semantic labels indicative of a number of objects, such as road 230A, sky 230B, building/wall 230C, traffic cone 230D, sidewalk 230E, road barrier 230F, another vehicle 230G, another vehicle 230H, etc. The coarse occupancy map 230 may also provide unoccupied voxels having semantic labels indicative of vacancies. The vacancies may represent spaces that is considered "empty" with respect to containing objects (e.g., detected objects of the predefined object classes). The coarse occupancy map 230 comprises voxels of the same resolution and within the same lower-resolution range. The coarse occupancy map 230 is generated quickly with every object displayed therein exhibiting the same level of detail. Afterwards, the coarse occupancy map 230 is transmitted to the combiner 140 as shown in FIG. 1.

Also, as shown in FIG. 1, the adaptive resolution generator 100 includes a higher-resolution module 130. The higher-resolution module 130 includes a machine learning system 132. The machine learning system 132 includes at least one machine learning model, which is configured to generate object detection data, e.g., the object boundary data 240, using the feature maps 210. In addition, the adaptive resolution generator 100 is configured to output this object boundary data 240 as one of the multi-modal outputs.

In an example embodiment, the machine learning system 132 includes at least a region proposal network (RPN). The machine learning system 132 may include an object proposal network (OPN). The RPN or the OPN is adeptly integrated to pinpoint specific areas (e.g., regions and/or objects) within a scene that are deemed crucial such that computational efforts and resources are effectively focused on those specific areas. The machine learning system 132 (e.g., RPN, OPN, etc.) uses object classes, which are predefined. In this regard, the object classes may be specified by at least one user. For instance, as a non-limiting example, the object classes may include vehicles, pedestrians, road signs, animals, road barriers, and/or one or more other objects that are deemed relevant or important in the decision-making process for autonomous driving. The object boundary data 240 comprise object detections that correspond to the object classes. The selection of and focus on these specific regions (e.g., specific objects) is advantageous over an approach in which an entire scene is processed uniformly at least since this approach focuses computational expenditure in important regions within the scene whereas uniform processing often leads to unnecessary computational expenditure and reduced efficiency. As such, the adaptive resolution generator 100 is configured to selectively focus computational resources on selected objects for efficient and precise 3D semantic predictions.

More specifically, in an example embodiment, the machine learning system 132 includes at least a DETR-style (Detection Transformer) RPN, which is a distinct shift away from the traditional anchor-based methods, like the ones employed in R-CNN and its variants. Instead of using anchor boxes and sliding windows, DETR applies the Transformer architecture, initially designed for natural language processing tasks, to the domain of object detection. With a DETR-style RPN, the machine learning system 132 is configured to treat object detection as a direct set-based prediction problem, thereby being advantageous in eliminating the need for non-maximum suppression (NMS) and other complex intermediate steps.

Furthermore, upon identifying these key regions or specific areas via the object boundary data 240 and the corresponding feature volume data 220, the adaptive resolution generator 100 shifts its attention to higher-resolution surface construction with higher precision within the confines of these key regions or specific areas of the set of objects associated with the object boundary data 240. In this regard, the higher-resolution module 130 also includes a machine learning system 134. To concentrate high-resolution occupancy estimation specifically within confines of the object boundary data 240 (e.g., the proposed bounding boxes for detected objects), the machine learning system 134 is configured to construct high-resolution surface data 250 for each region of interest. As an example, the predicted bounding box $\hat{B}$ may be defined by equation 1, where P(object|B) is the probability that an object is present given the bounding box B and P(object|image) is the likelihood of the bounding box B given the input image I. In addition, the setup from DETR may be followed to regress 900 bounding boxes and computer their object classification scores.

$$\hat{B} = \arg\max_{B} P(\text{object}|B) \cdot P(\text{object}|\text{image}) \qquad [1]$$

The machine learning system 134 includes at least one machine learning model, which is configured to generate surface data 250 using the object detection data or the object boundary data 240 and the corresponding feature volume data 220. The surface data 250 comprises high-resolution (or fine) surface data. The surface data 250 is generated with higher resolution and more detail than the coarse occupancy map 230. More specifically, a range of the resolution of the surface data 250 is greater than a range of the resolution of the coarse occupancy map 230. For example, the machine learning system 134 may comprise FoldingNet, Multiresolution Deep Implicit Functions (MDIF), or at least one decoding network that is configured to perform the functionalities as discussed herein. The machine learning system 134 may comprise a machine learning model that reconstructs objects in a scene using hierarchical shape reconstruction methods and provide advancements in shape completion.

In an example embodiment, the machine learning system 134 includes at least a decoder of FoldingNet, which uses neural networks to create surface data 250 for a 3D surface using the object boundary data 240 and the feature volume data 220. In this case, the surface data 250 is created from point clouds or voxel data. FoldingNet makes use of an origami-inspired folding process with several folding operations in which, for example, a point cloud is gradually turned into higher-dimensional space by folding layers leading to the creation of a continuous and accurate surface representation.

The folding operations are essentially a series of transformation matrices. These transformations are learned during the training phase. The decoder of FoldingNet is configured to transform each point on a 2D grid, in combination with the encoded feature vector, into a point in the 3D space. The feature vector informs how the 2D grid should be folded to best approximate the original 3D structure. With respect to FoldingNet, the decoder is configured to generate and/or output fine surface data 250 for the construction of a 3D surface corresponding to each object associated with the object boundary data 240. Every point in this cloud of the surface data 250 corresponds to a folded point from the 2D grid, and collectively, they approximate the shape and features of the original 3D point cloud.

By precisely reconstructing item surfaces within their respective 3D bounding boxes, the higher-resolution module 130 is configured to capture fine-grained geometric information, which is especially well-suited for object-centric semantic scene filling. The folded point cloud $X_f$ is computed and represented by equation 2, where X denotes the original input point cloud or voxel data and where W and b represent learnable weights and biases associated with the folding operation.

$$X_f = \text{Fold}(X, W, b) \qquad [2]$$

As discussed above, the machine learning system 132 may include FoldingNet to perform a simple, computational efficient, and generalized decoding operation in point cloud reconstruction. As an example, for instance, the decoder of FoldingNet may be configured to receive cropped BEV features of each object from an estimated bounding box and then configured to reconstruct that object in point cloud format. The decoder of FoldingNet may include a multilayer perceptron (MLP) based decoder that uses cropped BEV features. The adaptive resolution generator 100 is configured to output this point cloud data as one of the multi-modal outputs. The higher-resolution module 130 may be configured to further process the object point cloud into a finer occupancy format or a smooth mesh surface using Poisson surface reconstruction.

FIG. 2B shows a visualization of non-limiting data examples relating to the higher-resolution module 130. As discussed earlier, the higher-resolution module 130 includes a machine learning system 132, which is configured to identify a set of objects and generate object boundary data 240 for that set of objects using the feature maps 210. As an example, FIG. 2B shows a visualization of a scene that includes a first car and a second car on a road. With respect to this example, the object boundary data 240 includes object boundary data 242 for the first car and object boundary data 244 for the second car. In addition, FIG. 2B shows a visualization of the feature volume data 220 that includes feature volume data 222 for the first car and feature volume data 224 for the second car. Also, FIG. 2B illustrates that the machine learning system 134 is configured to generate at least higher-resolution surface data 250 that includes higher-resolution surface data 252 of the first car and higher-resolution surface data 254 of the second car for the set of objects associated with the object boundary data 242 and the object boundary data 244 based on the 3D feature volume data 252 and the 3D feature volume data 254.

By leveraging advanced algorithms and computational techniques, the machine learning system 134 meticulously constructs high-resolution surface data 250 for the set of objects associated with the object boundary data 240, thereby ensuring a higher level of detail and greater accuracy for that particular set of objects compared to the low-resolution portions (e.g., background portions, unoccupied portions, etc.) of the hybrid occupancy map 260. The other portions and/or remaining portions that are not associated with that set of the objects of the hybrid occupancy map 260 comprise the low-resolution of the coarse occupancy map 230. Next, the adaptive resolution generator 100 includes a combiner 140, which is configured to generate a hybrid occupancy map 260 by combining the coarse occupancy map 230 generated from the lower-resolution module 120 and the surface data 250 generated from the higher-resolution module 130. The hybrid occupancy map 260 combines the surface data 250 and the coarse occupancy map 230 to generate a mixed resolution occupancy map that uses fine resolution for selected objects (e.g., foreground elements) and coarse resolution for non-selected objects (e.g., background elements).

FIG. 2C illustrates a non-limiting example of a hybrid occupancy map 260, which is generated by the adaptive resolution generator 100. The hybrid occupancy map 260 is generated by combining the coarse occupancy map 230 together with the surface data 250 associated with the proposed regions (e.g., the set of objects). In this regard, similarly to the coarse occupancy map 230, the hybrid occupancy map 260 is a comprehensive 3D semantic occupancy map, where each point in the space is assigned a probability of being occupied, along with a semantic label that categorizes the occupying object or material. The hybrid occupancy map 260 may be ego-centric. For example, in FIG. 2C, the hybrid occupancy map 260 may also display the ego vehicle 10 (e.g., mobile robot) as a reference.

In addition, and in contrast to the coarse occupancy map 230, the hybrid occupancy map 260 provides adaptive resolution (i.e., one or more resolution ranges) based on the defined object classes. More specifically, the hybrid occupancy map 260 includes a set of objects, associated with the object boundary data 240, in which surface data 250 is generated with higher-resolution while the remaining portions of the hybrid occupancy map 260 comprise the lower-resolution of the coarse occupancy map 230. The hybrid occupancy map 260 provides a 3D display of an environment with occupied voxels having semantic labels indicative of a number of objects, such as road 230A, sky 230B, building/wall 230C, traffic cone 250D, sidewalk 230E, road barrier 250F, another vehicle 250G, another vehicle 250H, etc. In FIG. 2C, the elements that are labeled with 230 comprise a coarse resolution while the elements that are labeled with 250 comprise a fine resolution. As a non-limiting example, in FIG. 2C, the coarse resolution may correspond to voxel sizes that is greater than 0.2 m, whereas the fine resolution may correspond to voxel sizes in a range that is less than or equal to 0.2 m. Also, in this non-limiting example, the grid size for the hybrid occupancy map 260 includes 0.2 m, 0.4 m, 0.8 m, etc. The coarse occupancy map 230 may also provide unoccupied voxels having semantic labels indicative of vacancies. The coarse occupancy map 230 comprises at least a number of background elements with voxels having a lower-resolution (e.g., road 230A, sky 230B, building/wall 230C, etc.) and a set of objects with voxels having a higher-resolution (e.g., traffic cone 250D, sidewalk 250E, road barrier 250F, another vehicle 250G, another vehicle 250H, etc.). With adaptive resolution, the hybrid occupancy map 260 is configured to provide greater detail and higher-resolution for a particular set of objects while quickly generating lower-resolution for other background elements for 3D semantic occupancy in real-time computer vision applications, thereby concentrating computing resources to more relevant regions.

As discussed above, the adaptive resolution generator 100 provides a dual-stage approach involving at least one lower-resolution module 120 and at least one higher-resolution module 130. In this regard, the higher-resolution module 130 selectively provides greater resolution of voxel data compared to the lower-resolution module 120. The adaptive resolution generator 100 is advantageous in optimizing resource utilization (e.g., GPU resource utilization, memory utilization, etc.) via selective and adaptive resolution. The adaptive resolution generator 100 also elevates the precision of occupancy predictions and thus is a cornerstone for various computer vision applications that demand real-time and highly accurate environmental understanding.

The adaptive resolution generator 100 addresses the challenge of object-centric semantic scene completion through the integration of three loss components: focal loss, DeTR loss, and chamfer loss. The adaptive resolution generator 100 applies focal loss $\mathcal{L}_{focal}$ with respect to predicting semantic labels, especially for background contextual understanding. For foreground, the adaptive resolution generator 100 applies the DeTR loss (LDeTR) to detect bounding box. This loss selects N valid boxes from a set of bounding box candidates, and estimates each valid box position in parallel. Lastly, the chamfer loss (Lchamfer) serves as a pivotal component for foreground object surface reconstruction, quantifying the dissimilarity between the reconstructed and ground truth surfaces.

Focal Loss is a classification loss, specialized to tackle problems such as class imbalances and harder-to-detect labels. In this setup, the adaptive resolution generator 100 iteratively predicts the probability of each voxel belonging to a specific object class. If the probability of each class falls below a critical threshold $\epsilon$, the adaptive resolution generator 100 assigns the voxel to free space. The focal loss for an occupancy map M is computed via equation 3, where p(•) represents the predicted probability of the correct class, $\alpha$ and $\beta$ represents hyperparameters to balance well-classified and hard examples.

$$\mathcal{L}_{focal}(M) = \sum_{x_{min}}^{x_{max}} \sum_{y_{min}}^{y_{max}} \sum_{z_{min}}^{z_{max}} -\alpha(1-p(x, y, z))^{\beta}\log(p(x, y, z)) \quad [3]$$

DeTR loss includes focal loss and L1 loss, which classifies the number of valid boxes from 900 bounding box candidates loss and estimate each valid box position respectively. Focal loss is similar to equation 4, which is configured to predict all objects' classes. If the probability of all classes are below a certain threshold $\epsilon$, the box is predicted as invalid. Besides, L1 loss is a regression loss that minimizes the difference between N predicted bounding box $B_{pred}$ and N corresponding ground truth bounding box $B_{GT}$ as computed via equation 4.

$$\mathcal{L}_{regress} = \frac{1}{N} \sum_{i=1}^{N} |B_{pred} - B_{GT}| \quad [4]$$

Chamfer loss is a geometric distance-based loss function used for measuring the dissimilarity between two point sets. In the context of the adaptive resolution generator 100, the Chamfer loss quantifies the discrepancy between the reconstructed surface points and the ground truth points. The Chamfer loss $\mathcal{L}_{Chamfer}$ is defined by equation 5, where X represents the reconstructed points, and Y denotes the ground truth points.

$$\mathcal{L}_{Chamfer} = \sum_{x \in X} \min_{y \in Y} \|x - y\|_2^2 + \sum_{y \in Y} \min_{x \in X} \|y - x\|_2^2 \quad [5]$$

Semantic Loss, specifically Cross-Entropy Loss, is a classification loss used to measure the discrepancy between predicted labels and ground truth labels. In this case, the adaptive resolution generator 100 assesses the difference between the predicted semantic labels of the completed scene and the actual semantic labels. The Cross-Entropy Loss, denoted as $\mathcal{L}_{CE}$, is determined and computed by equation 6, where C represents the number of classes, $y_{gt}$ represents the ground truth class probabilities, and $y_{pred}$ is the predicted class probabilities. These two loss functions, Chamfer Loss and Cross-Entropy Loss, collectively contribute to the optimization process in our semantic scene completion framework.

$$\mathcal{L}_{CE} = -\sum_{c=1}^{C} y_{gt,c} \log(y_{pred,c}) \quad [6]$$

Figure 3:
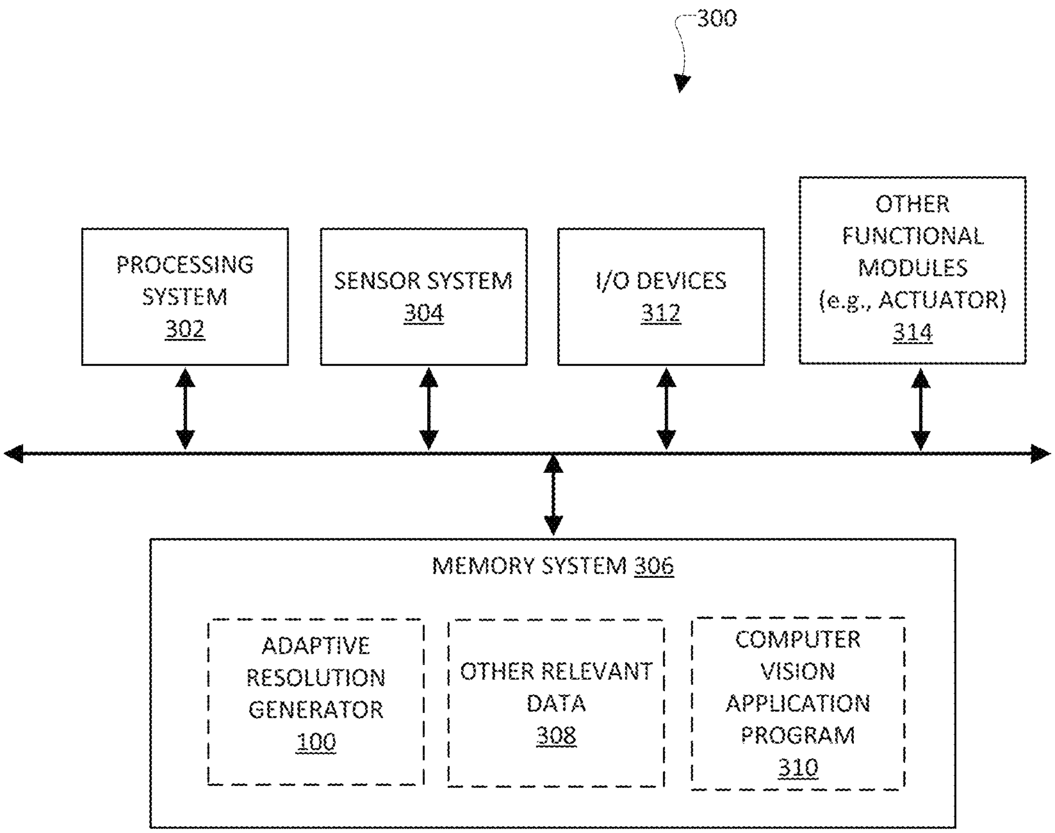
FIG. 3 is a block diagram of an example of a system configured to generate a hybrid occupancy map for a computer vision application program according to an example embodiment of this disclosure.

FIG. 3 is a block diagram of an example of a system 300 that includes an adaptive-resolution generator 100, which is configured to generate a hybrid occupancy map 260, according to an example embodiment. The system 300 is configured to perform the process of the adaptive resolution generator 100 of FIG. 1. The system 300 includes at least a processing system 302. The processing system 302 includes at least one processing device. For example, the processing system 302 may include an electronic processor, a central processing unit (CPU), a graphics processing unit (GPU), a tensor processing unit (TPU), a microprocessor, a field-programmable gate array (FPGA), an application-specific integrated circuit (ASIC), any processing technology, or any number and combination thereof. The processing system 302 is operable to provide the functionality as described herein.

The system 300 includes at least one sensor system 304. The sensor system 304 includes one or more sensors. For example, the sensor system 304 includes at least an image sensor, such as a camera that generates digital images. The sensor system 304 may include at least one other type of sensor (e.g., radar, LiDAR, infrared, etc.) to obtain additional sensor data, whereby the sensor system 304 may generate digital images based on this additional sensor data. The sensor system 304 is operable to communicate with one or more other components (e.g., processing system 302 and memory system 306) of the system 300. For example, the sensor system 304 may provide sensor data (e.g., digital images), which is then processed by the processing system 302. The sensor system 304 is local, remote, or a combination thereof (e.g., partly local and partly remote) with respect to one or more components of the system 300. Upon receiving the sensor data (e.g., one or more digital images), the processing system 302 is configured to process this sensor data (e.g. digital images) in connection with the adaptive resolution generator 100, the other relevant data 308, the computer vision application program 310, or any number and combination thereof.

The system 300 includes a memory system 306, which is operatively connected to the processing system 302. In this regard, the processing system 302 is in data communication with the memory system 306. The memory system 306 includes at least one non-transitory computer readable storage medium, which is configured to store and provide access to various data to enable at least the processing system 302 to perform the operations and functionality, as disclosed herein. The memory system 306 comprises a single memory device or a plurality of memory devices. The memory system 306 may include electrical, electronic, magnetic, optical, semiconductor, electromagnetic, or any suitable storage technology. For instance, the memory system 306 may include random access memory (RAM), read only memory (ROM), flash memory, a disk drive, a memory card, an optical storage device, a magnetic storage device, a memory module, any suitable type of memory device, or any number and combination thereof.

The memory system 306 includes at least an adaptive resolution generator 100, which is configured is configured to generate one or more hybrid occupancy maps 260 using a set of digital images. The adaptive resolution generator 100 includes computer readable data that, when executed by the processing system 302, is configured to perform at least the functions disclosed in this disclosure. The computer readable data may include instructions, code, routines, various related data, any software technology, or any number and combination thereof. For instance, in an example embodiment, the adaptive resolution generator 100 includes a number of software technologies and machine learning models as discussed with respect to FIG. 1. More specifically, the adaptive resolution generator 100 includes an image encoder, which comprises machine learning system 112. The adaptive resolution generator 100 includes a 3D generator 114. The adaptive resolution generator 100 includes a semantic occupancy decoder, which comprises machine learning system 122. The adaptive resolution generator 100 includes a region generator, which comprises machine learning system 132. Also, the adaptive resolution generator 100 includes surface constructor, which comprises machine learning system 134. In addition, the adaptive resolution generator 100 includes combiner 140 to generate the hybrid occupancy maps 260. The adaptive resolution generator 100 is configured such that occupancy detection, object detection, and surface construction/reconstruction are tasks, which are jointly trained given a shared spatial temporal backbone. This joint training, reflected from all three tasks, enhances the 3D understanding of the environment.

Also, the memory system 306 the other relevant data 308 provides various data (e.g., operating system, etc.), which enables the system 300 and/or the processing system 302 to perform the functions as discussed herein. In addition, the memory system 306 may include a computer vision application program 310, which includes computer readable data that, when executed by the processing system 302, is configured to apply one or more hybrid occupancy maps 260 to a computer vision application. The computer readable data may include instructions, code, routines, various related data, any software technology, or any number and combination thereof. As a non-limiting example, the computer vision application program 310 may relate to a navigation program that provides navigation using one or more hybrid occupancy maps 260.

The system 300 may include one or more I/O devices 312 (e.g., display device, microphone, speaker, etc.). As an example, for instance, the system 300 may include a display device, which is configured to display one or more hybrid occupancy maps and/or related data. As a non-limiting example, for instance, the system 300 includes a touchscreen on a mobile communication device that displays the hybrid occupancy map or related data. This feature is advantageous in enabling a user to interact with one or more hybrid occupancy maps.

In addition, the system 300 includes other functional modules 314, such as any appropriate hardware, software, or combination thereof that assist with or contribute to the functioning of the system 300 and/or the adaptive resolution generator 100. For example, the other functional modules 314 include communication technology (e.g., wired communication technology, wireless communication technology, or a combination thereof) that enables components of the system 300 to communicate with each other and/or one or more other computing devices (not shown), e.g., mobile communication device, smart phone, laptop, tablet, server, a cloud computing system, etc.

Also, the other functional modules 314 may include other components, such as an actuator. In this regard, for instance, when the adaptive resolution generator 100 is employed in a at least a vehicle (e.g., an automotive vehicle, a robot vacuum, etc.), the other functional modules 314 further include one or more actuators, which relate to driving, steering, stopping, and/or controlling a movement of the vehicle based at least on one or more hybrid occupancy maps.

As described in this disclosure, the embodiments provide a number of advantages and benefits. For example, the embodiments provide an adaptive-resolution approach for 3D semantic occupancy maps. The embodiments solve trade-offs between precision and computational efficiency since high resolution prediction is only performed in particular regions, where precision matters. In this regard, the embodiments are selective in concentrating detail where precise information matters most to the user and/or the downstream application. High-resolution provides greater information (e.g., semantic information, occupancy information, spatial information, distance representation, etc.) at the cost of higher computational loads and greater computer resources. In contrast, low-resolution is associated with lower computational loads and less computer resources but provides less information. The embodiments are configured to effectively balance precision and resources by selectively providing higher resolution in meaningful regions and lower resolution in non-meaningful regions (e.g., empty regions that are not occupied by objects of the predefined object classes). For example, the embodiments include generating higher resolution for foreground objects of predefined object classes and lower resolution for the background scene, wherein the higher resolution is finer and more detailed than the lower resolution. The balancing of computational resources is a critical aspect in various applications (e.g., dynamic driving environments), as the inefficient usage of computer resources may impede real-time decision-making.

Also, with respect to 3D maps that are occupancy-based, the embodiments provide two or more resolutions with multiple-sized grids of various dimensions, thereby not being limited to a single, common resolution (or fixed-grain resolution) involving one fixed-sized grid with uniform dimensions. Unlike other approaches for 3D semantic occupancy prediction with a fixed voxel size, the embodiments provide a new paradigm for 3D semantic occupancy prediction that supports multiple voxel sizes in the same hybrid occupancy map 260. That is, a single 3D hybrid occupancy map 260 may comprise several different sizes of voxels. The higher resolution (e.g., smaller voxel sizes) provides greater detail and precision while the lower resolution (e.g., larger voxel sizes) reduces computational load (e.g., processing and memory requirements). The embodiments strategically optimize the computational efficiencies of semantic occupancy predictions while ensuring that high-resolution details are also provided for various real-time applications (e.g., autonomous driving systems, etc.). In this regard, the embodiments enable, for example, vehicles to navigate safely and efficiently in real-time while responding to dynamic changes in their environment with enhanced awareness and precision. The embodiments generate multi-modal outputs (e.g., hybrid occupancy map 260), which may be used in the development and optimization of safe, reliable, and advanced autonomous driving systems.

In addition, the embodiments support different region proposal modes for high-precision occupancy prediction. As an example, the region proposal mode may include distance-based region proposal, object-based region proposal, motion-based region proposal, another region proposal, or any number and combination thereof.

Furthermore, the embodiments integrate object detection and semantic segmentation in a joint-learning framework, which facilitates a more comprehensive understanding of the 3D environment. The embodiments enhance 3D comprehension by integrating object detection, semantic segmentation, and surface reconstruction. The embodiments possess strategic focus by providing detailed predictions on predetermined objects around an ego vehicle, thereby paving the way for more advanced real-time navigation, multiple output formats, and safety in autonomous driving systems.

As discussed above, the embodiments merge object detection and surface reconstruction into a jointly trained pipeline, which effectively improves tasks relating to object detection and occupancy prediction by learning detailed features within each object bounding box. The embodiments exhibit how surface reconstruction helps to learn representation in a more computation efficient way by applying high resolution grids on important objects, such as humans, cars, animals, etc. In addition, the joint training may improve object detection at least since the fine surface construction further refines the features within objects' feature-dense areas. The embodiments include joint training and an architecture, which may increase the near range occupancy prediction performance at least since surface reconstruction inside a bounding box enhances each feature learned inside a bounding box. Also, applying more constraints between the coarse occupancy prediction and the object surface reconstruction may increase the consistency between the occupancy prediction task and instance segmentation task.

Furthermore, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally, or alternatively, components and functionality may be separated or combined differently than in the manner of the various described embodiments and may be described using different terminology. These and other variations, modifications, additions, and improvements may fall within the scope of the disclosure as defined in the claims that follow.

The invention claimed is:

1. A computer-implemented method comprising:

receiving a set of digital images, the set of digital images displaying at least an environment and a set of objects;

generating, via a first machine learning system, feature maps using the set of digital images;

generating, via a second machine learning system, object boundary data of the set of objects using the feature maps;

generating three-dimensional (3D) feature volume data using the feature maps;

generating a coarse occupancy map using the 3D feature volume data, the coarse occupancy map having a first resolution of a first range, the coarse occupancy map including the environment and the set of objects;

generating surface data of the set of objects using the object boundary data and the 3D feature volume data, the surface data having a second resolution of a second range, the second range being different than the first range; and generating a hybrid occupancy map by combining the coarse occupancy map and the surface data, the hybrid occupancy map displaying the environment with voxels of a first voxel size corresponding to the first resolution and the set of objects with voxels of a second voxel size corresponding to the second resolution, wherein the second voxel size is different than the first voxel size.

2. The computer-implemented method of claim 1, wherein the second machine learning system includes a region proposal network (RPN) that generates the object boundary data using the feature maps.

3. The computer-implemented method of claim 1, wherein the coarse occupancy map is generated via a third machine learning system that decodes the 3D feature volume data.

4. The computer-implemented method of claim 1, wherein the surface data is generated via another machine learning system using the object boundary data and the 3D feature volume data.

5. The computer-implemented method of claim 4, wherein the another machine learning system includes a series of transformation matrices that generate the surface data of the set of objects.

6. The computer-implemented method of claim 1, wherein the second range is greater than the first range such that the second resolution of the set of objects is greater than the first resolution of the environment.

7. The computer-implemented method of claim 1, further comprising:

controlling an actuator using the hybrid occupancy map, wherein the actuator is a component of a vehicle.

8. A system comprising:

one or more processors;

one or more computer memory in data communication with the one or more processors, the one or more computer memory having computer readable data stored thereon, the computer readable data including instructions that, when executed by one or more processors, causes the one or more processors to perform a method, the method including receiving a set of digital images, the set of digital images displaying at least an environment and a set of objects;

generating, via a first machine learning system, feature maps using the set of digital images;

generating, via a second machine learning system, object boundary data of the set of objects using the feature maps;

generating three-dimensional (3D) feature volume data using the feature maps;

generating a coarse occupancy map using the 3D feature volume data, the coarse occupancy map having a first resolution of a first range, the coarse occupancy map including the environment and the set of objects;

generating surface data of the set of objects using the object boundary data and the 3D feature volume data, the surface data having a second resolution of a second range, the second range being different than the first range; and generating a hybrid occupancy map by combining the coarse occupancy map and the surface data, the hybrid occupancy map displaying the environment with voxels of a first voxel size corresponding to the first resolution and the set of objects with voxels of a second voxel size corresponding to the second resolution, wherein the second voxel size is different than the first voxel size.

9. The system of claim 8, wherein the second machine learning system includes a region proposal network (RPN) that generates the object boundary data using the feature maps.

10. The system of claim 8, wherein the coarse occupancy map is generated via a third machine learning system that decodes the 3D feature volume data.

11. The system of claim 8, wherein the surface data is generated via another machine learning system using the object boundary data and the 3D feature volume data.

12. The system of claim 11, wherein the another machine learning system includes a series of transformation matrices that generate the surface data of the set of objects.

13. The system of claim 8, wherein the second range is greater than the first range such that the second resolution of the set of objects is greater than the first resolution of the environment.

14. The system of claim 8, wherein the method further comprises:

controlling an actuator using the hybrid occupancy map, wherein the actuator is a component of a vehicle.

15. One or more non-transitory computer readable mediums having computer readable data stored thereon, the computer readable data including instructions that, when executed by one or more processors, cause the one or more processors to perform a method, the method comprising:

receiving a set of digital images, the set of digital images displaying at least an environment and a set of objects;

generating, via a first machine learning system, feature maps using the set of digital images;

generating, via a second machine learning system, object boundary data of the set of objects using the feature maps;

generating three-dimensional (3D) feature volume data using the feature maps;

generating a coarse occupancy map using the 3D feature volume data, the coarse occupancy map having a first resolution of a first range, the coarse occupancy map including the environment and the set of objects;

generating surface data of the set of objects using the object boundary data and the 3D feature volume data, the surface data having a second resolution of a second range, the second range being different than the first range; and generating a hybrid occupancy map by combining the coarse occupancy map and the surface data, the hybrid occupancy map displaying the environment with voxels of a first voxel size corresponding to the first resolution and the set of objects with voxels of a second voxel size corresponding to the second resolution, wherein the second voxel size is different than the first voxel size.

16. The one or more non-transitory computer readable mediums of claim 15, wherein the second machine learning system includes a region proposal network (RPN) that generates the object boundary data using the feature maps.

17. The one or more non-transitory computer readable mediums of claim 15, wherein the coarse occupancy map is generated via a third machine learning system that decodes the 3D feature volume data.

18. The one or more non-transitory computer readable mediums of claim 15, wherein the surface data is generated via another machine learning system using the object boundary data and the 3D feature volume data.

19. The one or more non-transitory computer readable mediums of claim 18, wherein the another machine learning system includes a series of transformation matrices that generate the surface data of the set of objects.

20. The one or more non-transitory computer readable mediums of claim 15, wherein the second range is greater than the first range such that the second resolution of the set of objects is greater than the first resolution of the environment.

* * * * *